Dec. 15, 1925.
J. McDONOUGH
TESTING DEVICE
Filed April 10, 1922
1,565,577
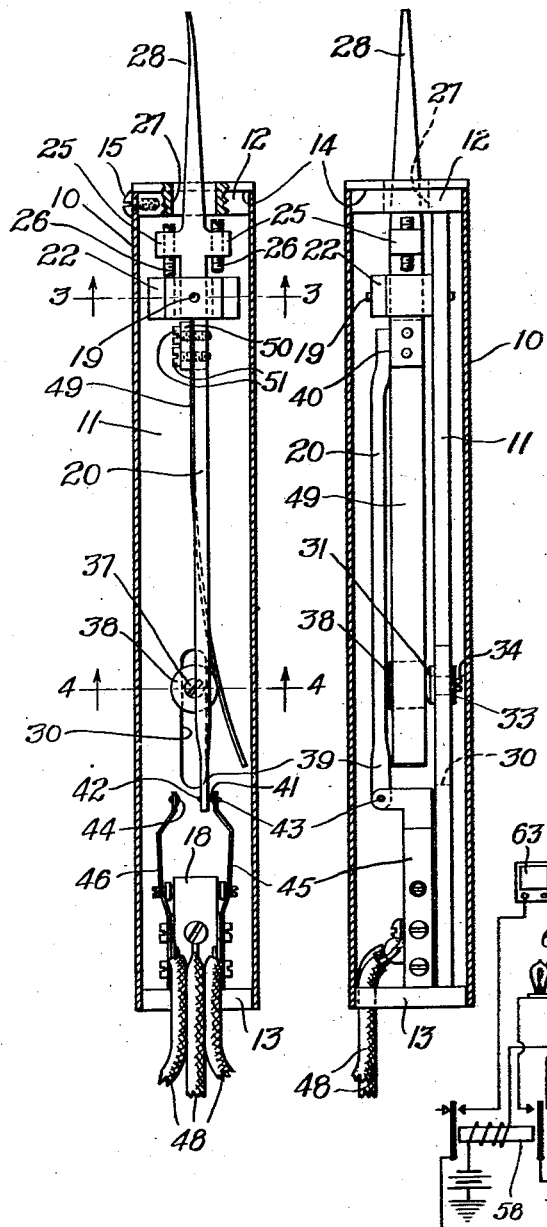
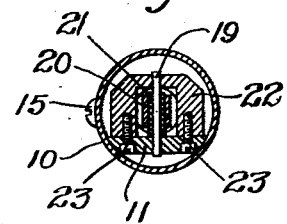
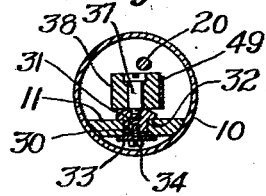
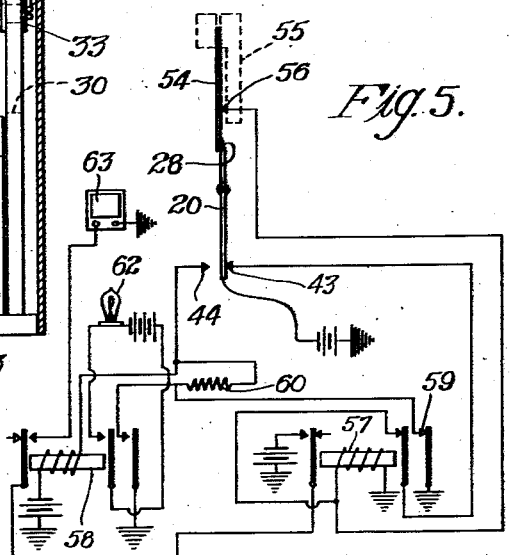
Inventor
John McDonough
by G. M. Campbell
Atty.

Patented Dec. 15, 1925.

1,565,577

UNITED STATES PATENT OFFICE.

JOHN McDONOUGH, OF CHICAGO, ILLINOIS, ASSIGNOR TO WESTERN ELECTRIC COMPANY, INCORPORATED, OF NEW YORK, N. Y., A CORPORATION OF NEW YORK.

TESTING DEVICE.

Application filed April 10, 1922. Serial No. 551,292.

*To all whom it may concern:*

Be it known that I, JOHN McDONOUGH, a citizen of the United States, residing at Chicago, in the county of Cook and State of Illinois, have invented certain new and useful Improvements in Testing Devices, of which the following is a full, clear, concise, and exact description.

This invention relates to testing devices, and more particularly to a device for testing the resilience of contact springs of the leaf type similar to those used in the telephone art.

The object of the invention is to provide a device adapted to be used with an electric signal set to determine whether the resistance of a spring to deflection is within maximum and minimum limits.

Another object of the invention is to construct a device of the above kind which is efficient in use, readily adjusted or changed whereby a wide range of resilient values may be tested, and is simple and compact in structure.

In its preferred form the device comprises a casing or hand grip enclosing a pivotal resilient member adapted at one end to engage the spring to be tested and at its other end to control a plurality of signal circuits in response to the resilience of the spring while being tested. The means for setting the pivotal member under resilience is adapted to be put under varying degrees of resilience and also to be removed and exchanged for means of greater or lesser resilience.

In the drawings:

Figure 1 is a longitudinal section through the casing or grip of the device;

Fig. 2 is a similar view thereof looking in a different direction;

Fig. 3 is a section taken upon the line 3—3 of Fig. 1 looking in the direction indicated by the arrows;

Fig. 4 is a section taken upon the line 4—4 of Fig. 1 looking in the direction indicated by the arrows, and Fig. 5 is a schematic diagram of the signal circuit set with the spring to be tested and the testing device indicated in position.

The invention as illustrated in the drawings is adapted to test the resilience of contact springs of the leaf type used extensively in the telephone art, but it will readily be understood that its use need not be confined to springs of that type, for it may be equally used to test the resilience of coil springs of the tension and compression types.

As shown in the drawings, 10 is a casing which also serves as a grip or handle for the testing device. The casing is preferably made from insulating material such as fiber. Within the casing 10 below the center thereof and extending substantially the full length thereof is a plate 11 carrying at the ends thereof head members 12 and 13. The head 12 is formed with a shoulder, as indicated at 14, and is secured to the casing 10 by a screw 15 as shown.

The head 13 is preferably composed of insulating material and is equipped with an inwardly extending portion 18 which is suitably secured to the plate 11 with the head 13 passing freely into the casing 10. Pivotally mounted upon the plate 11 at one end by a pin 19 is a contact bar 20 which is equipped with a hardened steel bushing 21. The pin 19 passes through the bushing 21 in the plate 11 and through a bridge shaped member 22 secured to the plate 11 by screws 23. The contact bar 20 is formed with outwardly extending lugs 25 at a point between the head 12 and the member 22. Screw threaded into each of the lugs 25 and adapted to engage the member 22 is an adjusting screw 26 which is adapted to be set to limit the turning of the contact bar 20 about its pivot pin 19. A suitable opening 27 is formed in the head 12 for the movement of the engaging end 28 of the contact bar 20.

Mounted in a slot 30 formed in the plate 11 is a roller support 31 provided with a shoulder 32 which rests against the plate 11. The slot 30 is in alinement with the pivot point of the bar 20. A retaining plate 33 on the opposite side of the plate 11 and a screw 34 threaded into the support 31 functions to clamp the roller support in its set position. Rotatably mounted on a pin 37 secured to the roller support 31 is a roller 38. The contact end 39 opposite to the engaging end 28 of the bar 20 is built from a rod or wire and brazed or secured in any suitable manner to the bar 20 at the point 40. Suitable electrical contacts 41 and 42 are secured to the contact end 39 of the bar 20. In line with the contacts 41 and 42 are contacts 43 and 44 secured to contact springs 45 and 46 carried upon the portion 18 of the head 13. The springs 45 and 46 are connected to an electric signal set by connecting leads 48, 48. Secured to the bar 20 below the pivot point thereof and in alinement therewith is a leaf spring 49 with the opposite end resting against the periphery of the roller 38. The spring 49 is removably secured to the bar 20 by the retaining plate 50 and screws 51.

By means of the roller 38 adapted to be moved in the slot 30 the pressure on the bar 20 through the action of the spring 49 may be varied within a certain degree and by substituting for the spring 49 a spring of greater or lesser resilience a wide range of resilient values may be tested.

The electrical circuit and signal set used in connection with the hand apparatus includes a lamp and a buzzer with the spring under test forming a part of the circuit and normally resting against a break contact included in the circuit with the engaging end 28 of the hand apparatus tending to force the spring under test away from the break contact when the engaging end 28 is pressed against the spring under test. The roller 38 is adjusted in the slot 30 to cause the required resistance to deflection of the spring 49 according to the type of spring to be tested.

The operation of the circuit of the signal set as shown in Fig. 5 is as follows:

The spring to be tested indicated at 54 is held in a suitable fixture 55 shown in dotted outline in Fig. 5, or it may be mounted on the member with which it is used and the member held in a fixture. The spring 54 while mounted on the fixture is held under pressure against a contact 56. The contact 56 is carried on the fixture and is included in the signal set circuit. The engaging end 28 of the pivoted contact bar 20 is placed in contact with the end of the spring 54 which immediately causes a relay 57 to operate. The circuit may be traced from ground through the winding of the relay 57 through the contact 56 and through the bar 20 to battery. Upon the operator exerting a slight pressure to the left, as shown in Fig. 5, with the end 28 of the device against the end of the spring 54 and the spring breaking engagement with the contact 56 before the contact on the lower end of the bar 20 breaks engagement with the contact 43 no signal will be given. This indicates to the operator that the spring 54 under test is too weak (below the minimum limit). If the spring is too strong, the contact on the lower end of the bar 20 will break engagement with the contact 43 before the engagement of the spring 54 with the contact 56 is broken. Under this condition the relay 57 operates as described above and a second relay 58 operates. The relay 58 operates when the engagement of the contact on the lower end of the bar 20 is broken with the contact 43. This circuit may be traced from ground through the right outer make contact 59 of the relay 57, through the resistance 60 and through the winding of relay 58 to battery.

The operation of the relay 58 closes a circuit which lights a lamp 62. The lighting of the lamp 62 indicates that the spring 54 is too strong (above the maximum limit). The engagement of the contact on the lower end of the bar 20 with the contact 44 locks the relay 57 from releasing and giving a false test in case the engagement of the spring 54 with the contact 56 should be broken.

When the spring under test has the proper resilience the spring breaks with the contact 56 after the engagement of the contact on the lower end of the bar 20 breaks with the contact 43, but before it makes engagement with the contact 44. With this condition the relay 57 operates as before and when the contact 43 is opened with the contact on the lower end of the bar 20 the relay 58 operates and locks to ground on its own armature and lights the lamp 62. When the engagement of the spring under test with the contact 56 is broken the relay 57 releases, permitting battery through its left armature, through the left contact of relay 58 to ground through the buzzer 63 and operating it. The operation of the buzzer 63 and the lighting of the lamp 62 indicates that the resilience of the spring 54 is within maximum and minimum limits.

What is claimed is:

1. In a device for determining the resilience between maximum and minimum limits of a spring, a casing serving as a hand grip, a member pivotally mounted within said casing and adapted to engage a spring to be tested, resilient means for actuating said member, and means under the joint control of the member and the spring to be tested to indicate the strength or weakness of the spring.

2. In a device for determining the resilience between maximum and minimum limits of a spring, a pivotal member adapted to engage a spring to be tested, resilient means for actuating said member, and an electric signal circuit adapted to be operated by the movement of said pivotal member in response to the resilience of the spring under test which is included in the circuit to indicate the strength or weakness of the spring.

3. In a device for determining the resilience between maximum and minimum limits of a spring, a pivotal member adapted at one end to engage a spring to be tested, resilient means for actuating said member, an electric signal, and an electric circuit for the said signal adapted to be operated by the movement of the opposite end of said pivotal member in response to the resilience of the spring under test which is included in the circuit to indicate the strength or weakness of the spring.

4. In a device for determining the resilience between maximum and minimum limits of a spring, the combination with a pivotal member adapted to engage the spring to be tested, of resilient means for actuating said pivotal member, means for varying the force exerted upon said pivotal member by said resilient means, and means under the joint control of the resiliently actuated member and the spring under test to indicate the strength or weakness of the spring.

5. In a device for determining the resilience between maximum and minimum limits of a spring, the combination with a pivotal member adapted to engage the spring to be tested, of a spring for actuating said pivotal member and secured at one end thereto, means associated with the opposite end of said spring for varying the resilient force thereof upon said pivotal member whereby springs of different resilient values may be tested, and means under the joint control of the resiliently actuated member and the spring under test to indicate the strength or weakness of the spring.

6. In a device for determining the resilience between maximum and minimum limits of a spring, the combination with a pivotal member adapted at one end to engage the spring for actuating said pivotal member and to be tested, of a leaf spring secured at one end thereto, an adjustably mounted roller in engagement with the opposite end of said spring for varying the resilient force thereof upon said pivotal member whereby springs of different resilient values may be tested, adjustable stop means mounted upon said pivotal member for limiting the movement thereof in either direction, and means under the joint control of the resiliently actuated member and the spring to be tested to indicate the strength or weakness of the spring.

7. In a device for determining the resilience between maximum and minimum limits of a spring, a casing serving as a hand grip, a member mounted within said casing and adapted to engage a spring to be tested, resilient means for actuating said member, and means under the joint control of the resiliently actuated member and the spring to be tested to indicate the strength or weakness of the spring.

8. In a device for determining the resilience between maximum and minimum limits of a spring, a pivotal member for engaging a spring to be tested, resilient means for actuating said member, a support therefor, adjustable stop means associated with said pivotal member for limiting the movement thereof, and means under the joint control of the pivotal member and the spring to be tested to indicate the strength or weakness of the spring.

9. In a device for determining the resilience between maximum and minimum limits of a spring, a casing serving as a hand grip, a pivotal member mounted within said casing and adapted to engage a spring to be tested, a member of predetermined resiliency acting thereon, and means under the joint control of the pivotal member and the spring to be tested to indicate the strength or weakness of the spring.

10. In a device for determining the resilience between maximum and minimum limits of a spring, a pivotal member for engaging a spring to be tested, an adjustable member of predetermined resiliency acting thereon, a support for said members, adjustable stop means associated with said pivotal member for limiting the movement thereof, and means under the joint control of the pivotal member and the spring to be tested to indicate the strength or weakness of the spring.

11. In a device for determining the resilience between maximum and minimum limits of a spring, a pivotal member for engaging a spring to be tested, a member of predetermined resiliency acting thereon, adjustably mounted means in engagement therewith for varying the resiliency thereof, a support for said members, and means under the joint control of the pivotal member and the spring to be tested to indicate the strength or weakness of the spring.

12. In a device for determining the resilience between maximum and minimum limits of a spring, a pivotal member adapted to engage a spring to be tested, a member of predetermined resiliency acting upon the opposite end of said pivotal member, and means under the joint control of the pivotal member and the spring to be tested to indicate the strength or weakness of the spring.

In witness whereof, I hereunto subscribe my name this 7th day of April, A. D. 1922.

JOHN McDONOUGH.